United States Patent
Shane

(10) Patent No.: US 10,221,958 B1
(45) Date of Patent: Mar. 5, 2019

(54) MAGNETICALLY TOGGLED VALVE APPARATUS

(71) Applicant: Alexander Michael Shane, Huntington Beach, CA (US)

(72) Inventor: Alexander Michael Shane, Huntington Beach, CA (US)

( * ) Notice: Subject to any disclaimer, the term of this patent is extended or adjusted under 35 U.S.C. 154(b) by 0 days.

(21) Appl. No.: 15/996,379

(22) Filed: Jun. 1, 2018

(51) Int. Cl.
F16K 31/08 (2006.01)

(52) U.S. Cl.
CPC .......... *F16K 31/088* (2013.01); *F16K 31/086* (2013.01)

(58) Field of Classification Search
CPC .............................. F16K 31/086; F16K 31/088
USPC ........................................................... 251/65
See application file for complete search history.

(56) References Cited

U.S. PATENT DOCUMENTS

| | | | |
|---|---|---|---|
| 576,068 A | 1/1897 | O'Lally | |
| 602,598 A | 4/1898 | Field | |
| 615,774 A | 12/1898 | Zimmerman | |
| 635,104 A | 10/1899 | Lunken et al. | |
| 2,269,127 A | 1/1942 | Riley | |
| 2,785,881 A | 3/1957 | Dolan | |
| 3,212,751 A * | 10/1965 | Hassa | F16K 31/086 251/129.03 |
| 3,233,625 A * | 2/1966 | Pase | F16K 31/086 137/416 |
| 4,481,389 A * | 11/1984 | Johnson | F16K 31/086 200/61.86 |
| 4,624,443 A * | 11/1986 | Eidsmore | F16K 17/24 137/460 |
| 4,694,860 A * | 9/1987 | Eidsmore | F16K 17/24 137/614.21 |
| 4,792,113 A * | 12/1988 | Eidsmore | F16K 17/24 137/460 |
| 5,288,053 A | 2/1994 | Young | |
| 5,290,008 A | 3/1994 | Young | |
| 5,704,594 A * | 1/1998 | Wurangian | F16K 3/18 251/195 |
| 6,588,682 B1 | 7/2003 | Flieger | |
| 7,093,615 B2 | 8/2006 | Shane | |
| 9,321,205 B2 * | 4/2016 | Galati | B29C 45/2806 |
| 2004/0011978 A1 | 1/2004 | Shen et al. | |

* cited by examiner

*Primary Examiner* — Umashankar Venkatesan

(57) ABSTRACT

A magnetically toggled valve apparatus is disclosed. In at least one embodiment, a valve body provides a valve cavity sized and configured for allowing a commodity to selectively flow therethrough, the valve cavity providing a commodity input configured for engagement with a commodity input source, and a commodity output in fluid communication with the commodity input. A toggle plunger is positioned within the valve cavity, with a first end of the toggle plunger providing a plunger magnet, and an opposing second end of the toggle plunger configured for selectively contacting a valve seat provided by a base of the valve cavity, the valve seat being proximal and in fluid communication with the commodity output. The toggle plunger is configured for moving between a closed position and an open position. An actuating magnet is positioned adjacent and external to the valve cavity. The actuating magnet is configured for selectively transitioning between an active state and an inactive state.

21 Claims, 11 Drawing Sheets

MAGNETICALLY TOGGLED VALVE APPARATUS

RELATED APPLICATIONS

Not applicable.

BACKGROUND

The subject of this patent application relates generally to valves, and more particularly to a magnetically toggled valve apparatus.

Applicant hereby incorporates herein by reference any and all patents and published patent applications cited or referred to in this application.

By way of background, valves for fluids or other commodities (such as gas or vapors) are often operated from an open to a closed state by mechanically driving a control arm that extends or protrudes from the case or frame and causes the valve to toggle from a fully on to a fully off mode in response to longitudinal or rotational movement of the control arm with respect to the case or frame. Existing valves that operate in this fashion have shaft penetration for control of the flow through the valve, which often requires seals and/or packing in order to prevent leaks. However, such existing valves tend to wear out over time, leak and require periodic replacement of the seals and/or packing.

Aspects of the present invention provide a solution to these problems, along with further related advantages as described in the following summary.

SUMMARY

Aspects of the present invention teach certain benefits in construction and use which give rise to the exemplary advantages described below.

The present invention solves the problems described above by providing a magnetically toggled valve apparatus. In at least one embodiment, a valve body provides a valve cavity sized and configured for allowing a commodity (such as a fluid, gas or vapor) to selectively flow therethrough, the valve cavity providing a commodity input configured for engagement with a commodity input source, and a commodity output in fluid communication with the commodity input (i.e., the commodity is capable of traveling between the commodity input and the commodity output). A toggle plunger is positioned within the valve cavity, with a first end of the toggle plunger providing a plunger magnet, and an opposing second end of the toggle plunger configured for selectively contacting a valve seat provided by a base of the valve cavity, the valve seat being proximal and in fluid communication with the commodity output. The toggle plunger is configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output. An actuating magnet is positioned adjacent and external to the valve cavity. The actuating magnet is configured for selectively moving or otherwise transitioning between an active state—wherein the actuating magnet is moved into sufficient proximity to the plunger magnet, or alternatively activated, such that a magnetic force of the actuating magnet acts upon the plunger magnet through the valve body in order to move the toggle plunger into the open position—and an inactive state—wherein the actuating magnet is moved a distance away from the plunger magnet, or alternatively deactivated, such that the magnetic force of the actuating magnet no longer acts upon the plunger magnet through the valve body, thereby causing the toggle plunger to move back into the closed position. Thus, in at least one embodiment, the apparatus eliminates the need for penetration of the valve body by a shaft to control the valve, thereby reducing the likelihood of the valve ever developing a leak (or requiring maintenance or repair), while also eliminating the need for a seal or packing.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 6B is a cross-sectional view taken along line A-A of FIG. 6a;

Figure 1A:
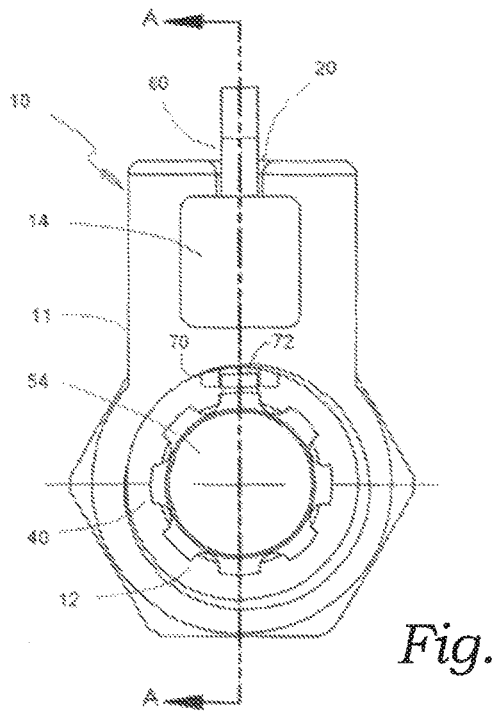
FIG. 1A is a top plan view of an exemplary magnetically toggled valve apparatus in a closed position, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION

Turning now to FIGS. 1A-3B, there are shown top plan views and corresponding cross-sectional views of an exemplary embodiment of a magnetically toggled valve apparatus 10. The apparatus 10 comprises, in the exemplary embodiment, a valve body 11 having a valve cavity 50 sized and configured for engagement with a commodity input source 13, thereby allowing a commodity (such as a fluid or gas) to selectively flow through the valve cavity 50, as discussed in detail below. In at least one embodiment, the valve cavity 50 provides a commodity input 12 configured for engagement with the commodity input source 13, and a commodity output 16 in fluid communication with the commodity input 12. The commodity input 12 is further configured for receiving the commodity from the commodity input source 13 and subsequently delivering and controlling the delivery of the commodity through the valve cavity 50 to the commodity output 16.

In at least one embodiment, a toggle plunger 40 is positioned within the valve cavity 50, such that a longitudinal axis of the toggle plunger 40 is substantially coaxial with a central axis of the valve cavity 50. In at least one such embodiment, a plunger magnet 54 is positioned at a first end 55 of the toggle plunger 40. An opposing second end 58 of the toggle plunger 40 is configured for selectively contacting a valve seat 48 provided by a base of the valve cavity 50, the valve seat 48 being proximal and in fluid communication with the commodity output 16. Thus, in at least one embodiment, the toggle plunger 40 is configured for moving between a closed position (FIG. 1B)—wherein the second end 58 of the toggle plunger 40 is in contact with the valve seat 48 so as to create a seal therebetween to prevent the commodity from flowing through the commodity output 16 (with the toggle plunger 40 being under pressure in the closed position)—and an open position (FIG. 3B)—wherein the second end 58 of the toggle plunger 40 is moved a distance away from the valve seat 48 so as to allow the commodity to flow through the valve seat 48 and, in turn, through the commodity output 16.

Figure 3A:
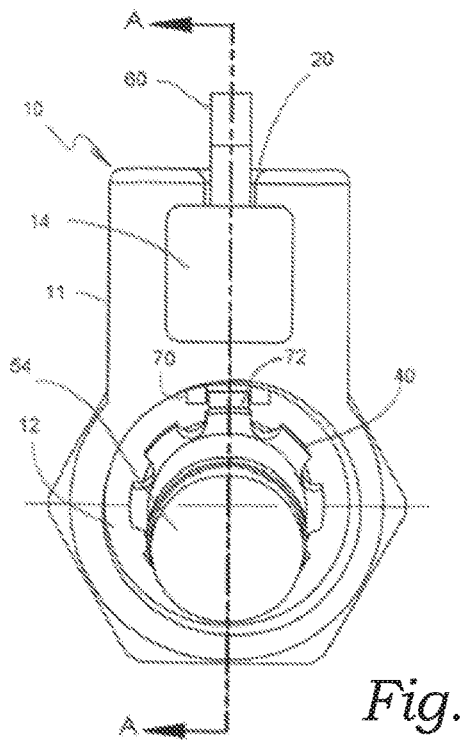
FIG. 3A is a top plan view of the exemplary magnetically toggled valve apparatus in a fully open position, in accordance with at least one embodiment.
Figure 3B:
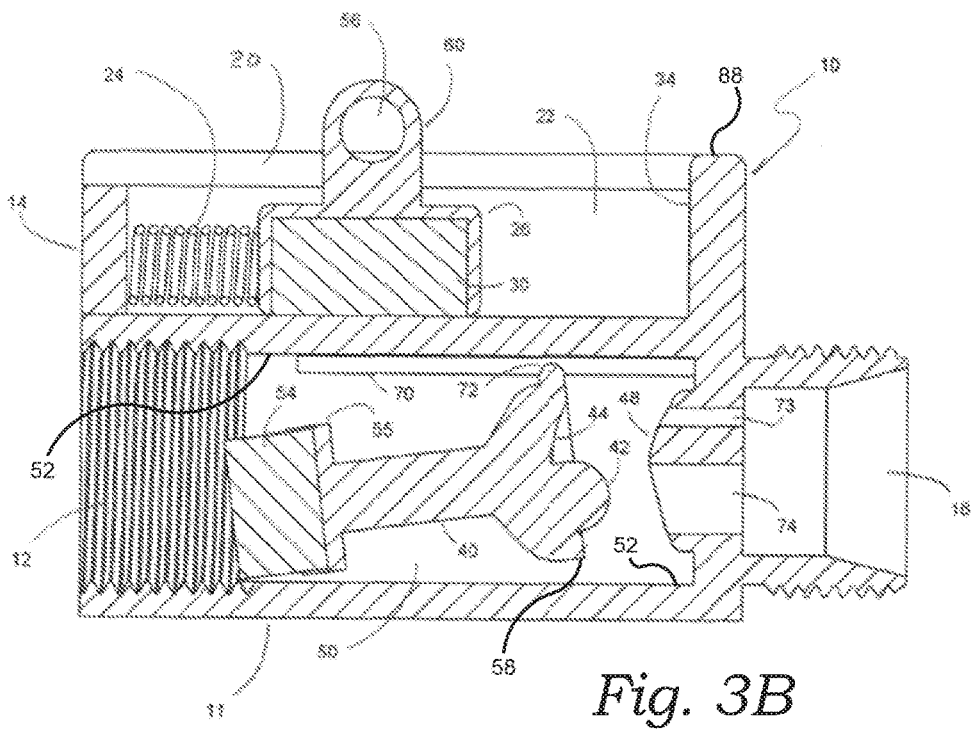
FIG. 3B is a cross-sectional view taken along line A-A of FIG. 3A.

In at least one embodiment, the second end 58 of the toggle plunger 40 provides a mating surface 44 sized and configured for complementing and mating with the valve seat 48 when the toggle plunger 40 is in the closed position. In at least one such embodiment, as best illustrated in FIG. 3B, the valve seat 48 provides an at least one pilot hole 73 and a main hole 74, with each extending through the valve seat 48, enabling fluid communication between the valve cavity 50 and the commodity output 16. Thus, in at least one embodiment, the mating surface 44 is sized and configured for covering both the pilot hole 73 and the main hole 74 when the toggle plunger 40 is in the closed position. In at least one alternate embodiment, the main hole 74 and at least one pilot hole 73 are configured as a plurality of concentrically arranged holes in the valve seat 48, with the holes in the outer ring(s) of the concentrically arranged holes each having a relatively smaller diameter than the holes in the inner ring(s) of the concentrically arranged holes. In such an embodiment, this arrangement of holes is intended to reduce the amount of force necessary to break the seal between the mating surface 44 and the valve seat 48 (as discussed further below), while also reducing or eliminating any potential water hammer effect, by increasing the flow of commodity gradually. In still further embodiments, the main hole 74 and at least one pilot hole 73 may take on any other configuration and/or arrangement, now known or later conceived. In at least one further alternate embodiment, the at least one pilot hole 73 is omitted. Additionally, in at least one embodiment, the mating surface 44 provides a valve closure 42 sized and configured for being removably engaged within the main hole 74 when the toggle plunger 40 is in the closed position. In at least one embodiment, the seal between the toggle plunger 40 and the valve seat 48 (when the toggle plunger 40 is in the closed position) is achieved—or at least assisted—by an at least one O-ring, or pliable mating surfaces, or the use of ceramic micro matched congruent and contiguous surfaces, or any other technique or mechanism now known or later developed.

In at least one embodiment, an actuating magnet 30 is positioned adjacent and external to the valve cavity 50. The actuating magnet 30 is configured for moving, or otherwise transitioning, between an active state—wherein the actuating magnet 30 is moved into sufficient proximity to the plunger magnet 54, or alternatively activated, such that the magnetic force of the actuating magnet 30 acts upon the plunger magnet 54 through the valve body 11 in order to move the toggle plunger 40 into the open position (as discussed further below)—and an inactive state—wherein the actuating magnet 30 is moved a distance away from the plunger magnet 54, or alternatively deactivated, such that the magnetic force of the actuating magnet 30 no longer acts upon the plunger magnet 54 through the valve body 11.

Figure 1B:
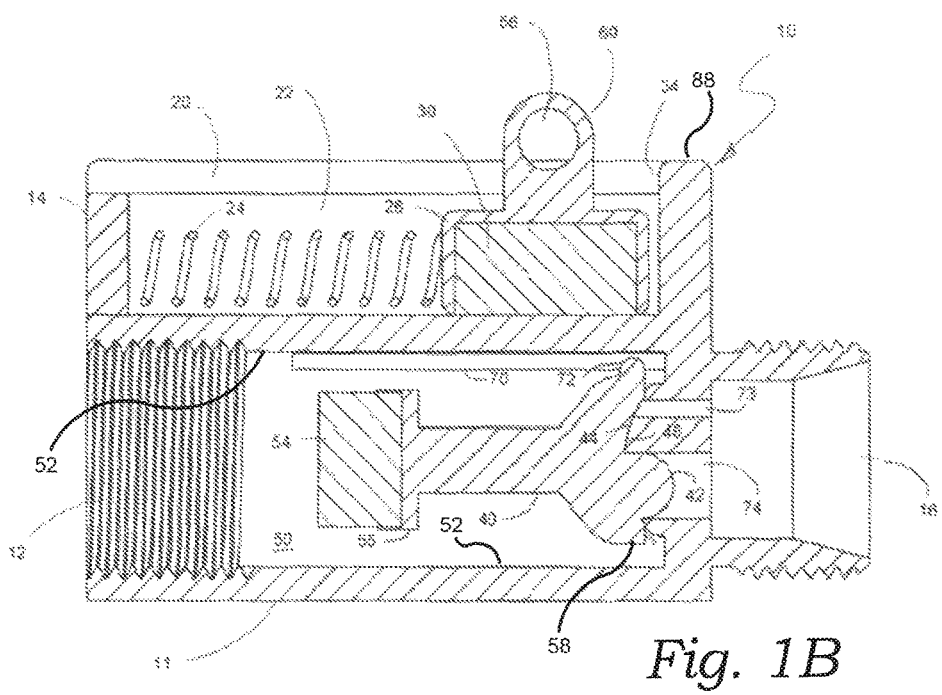
FIG. 1B is a cross-sectional view taken along line A-A of FIG. 1A.
Figure 2A:
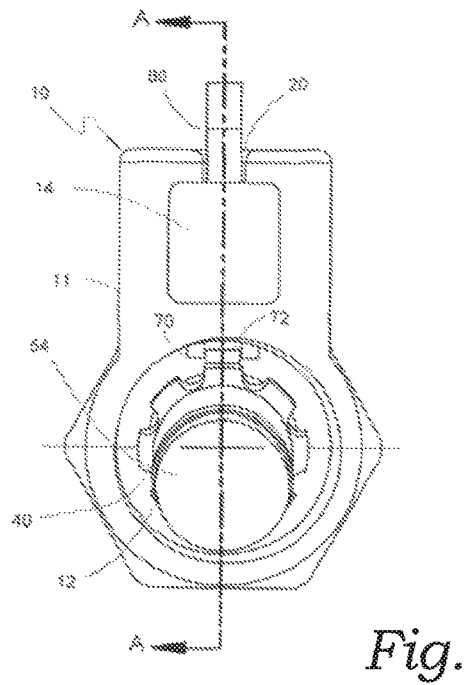
FIG. 2A is a top plan view of the exemplary magnetically toggled valve apparatus in a partially open position, in accordance with at least one embodiment.
Figure 2B:
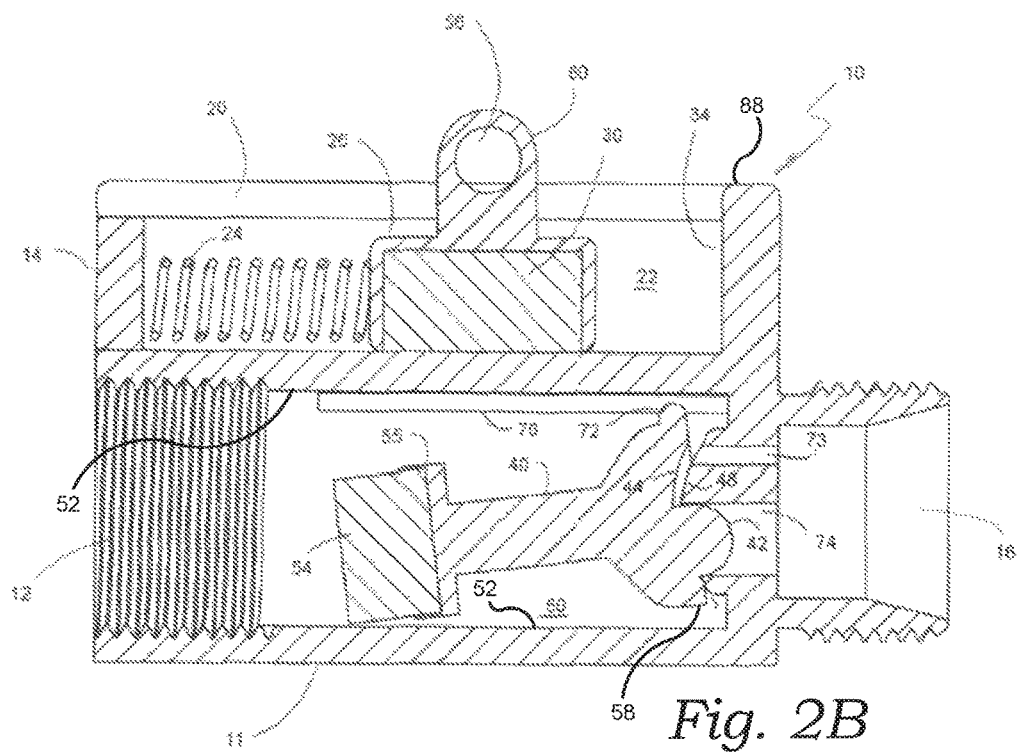
FIG. 2B is a cross-sectional view taken along line A-A of FIG. 2A.

Additionally, in at least one embodiment, the actuating magnet 30 has the same magnetic polarity as the plunger magnet 54. Thus, when the actuating magnet 30 is transitioned into the active state, the actuating magnet 30 repels the plunger magnet 54 which, in turn, causes the toggle plunger 40 to pivot away from the actuating magnet 30, toward an opposing inner wall 52 of the valve cavity 50 (opposite the actuating magnet 30), and move into the open position, breaking the seal between the mating surface 44 and the valve seat 48—as illustrated in FIGS. 1B, 2B and 3B for example. In at least one embodiment, this begins with the seal being broken between the portion of the mating surface 44 that selectively covers the pilot hole 73. As the mating surface 44 continues to separate from the valve seat 48, and the commodity begins to pass through the gap in the seal at the edge of the pilot hole 73, the downward force holding the toggle plunger 40 in the closed position is reduced in a process that is regenerative. The downward force, and the associated turbulence, lifts the toggle plunger 40 at an ever increasing rotational velocity as it pivots away from the actuating magnet 30, thereby snapping the toggle plunger 40 into the open position. In at least one such embodiment, the distance from a base of the plunger magnet 54 to the mating surface 44 of the toggle plunger 40, which resides on a fulcrum on the valve seat 48, operates as moment arm. Once the seal between the mating surface 44 and the valve seat 48 begins to break, as shown in FIG. 2B for example, the commodity begins to pass around the sides of the toggle plunger 40 and provides turbulence that lifts the toggle plunger 40 completely off of the valve seat 48 to a full flow condition, with the valve closure 42 removed from the main outlet 74, as depicted in FIG. 3B for example.

Figure 5A:
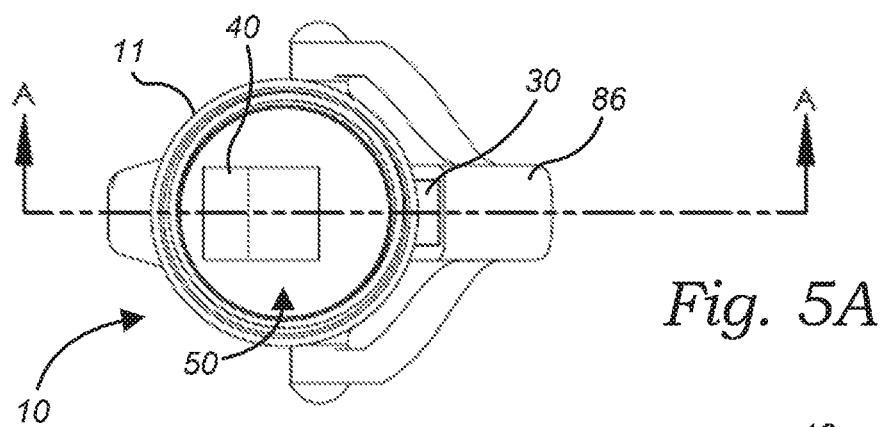
FIG. 5A is a top plan view of a still further exemplary magnetically toggled valve apparatus in a closed position, in accordance with at least one embodiment.
Figure 5B:
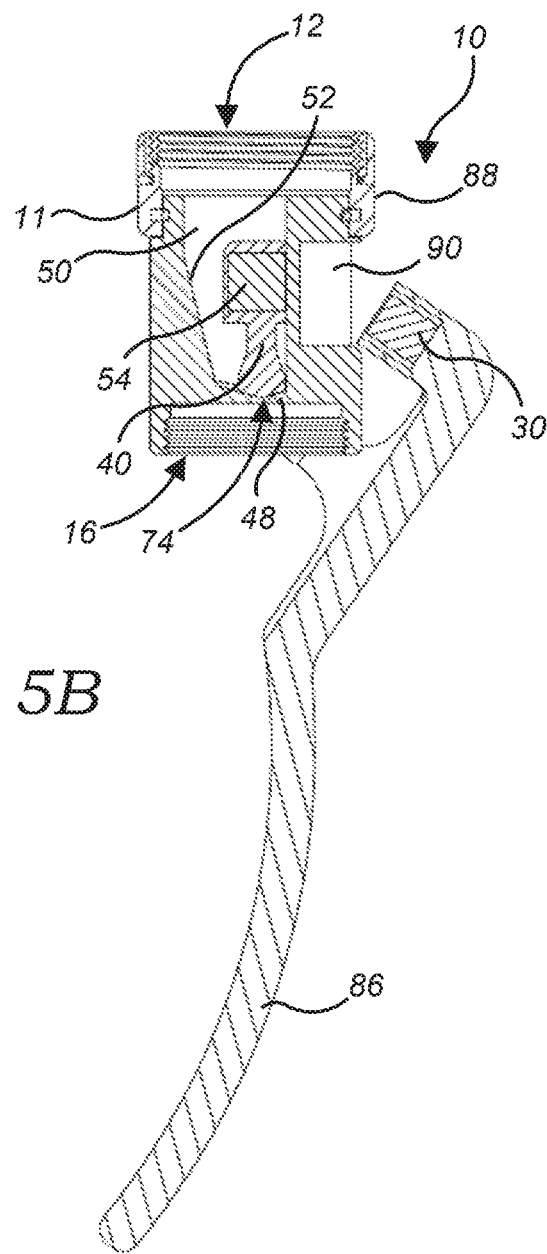
FIG. 5B is a cross-sectional view taken along line A-A of FIG. 5A.
Figure 6A:
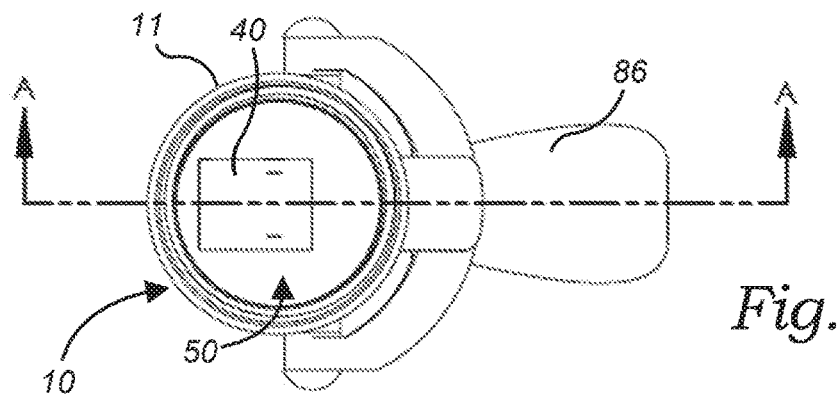
FIG. 6A is a top plan view of said still further exemplary magnetically toggled valve apparatus in an open position, in accordance with at least one embodiment.
Figure 6B:
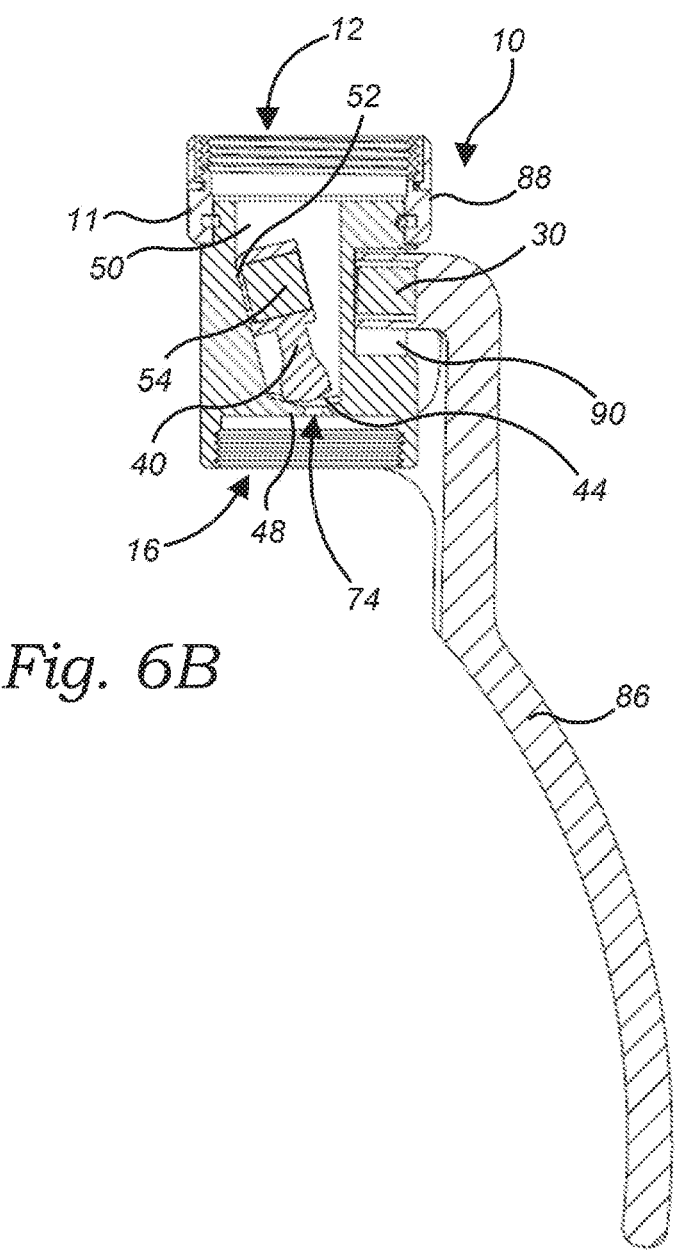
Figure 7A:
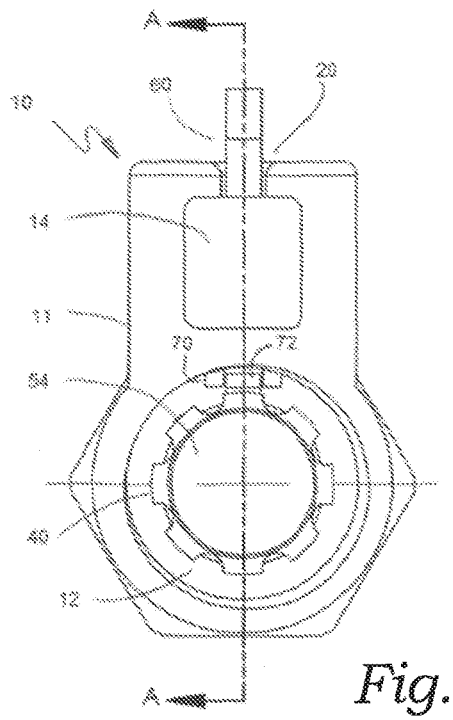
FIG. 7A is a top plan view of a still further exemplary magnetically toggled valve apparatus in a closed position, in accordance with at least one embodiment.
Figure 7B:
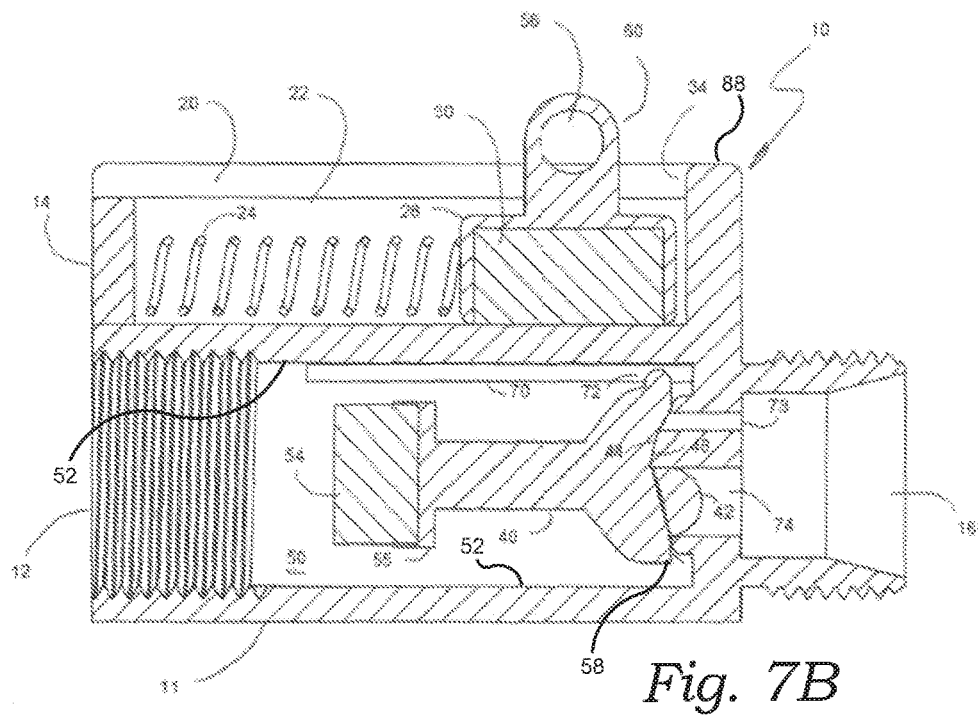
FIG. 7B is a cross-sectional view taken along line A-A of FIG. 7A.
Figure 8A:
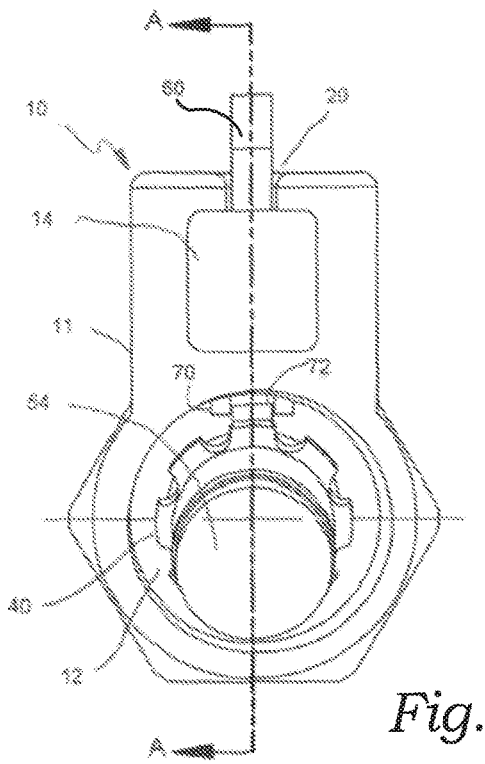
FIG. 8A is a top plan view of said still further exemplary magnetically toggled valve apparatus in a partially open position, in accordance with at least one embodiment.
Figure 8B:
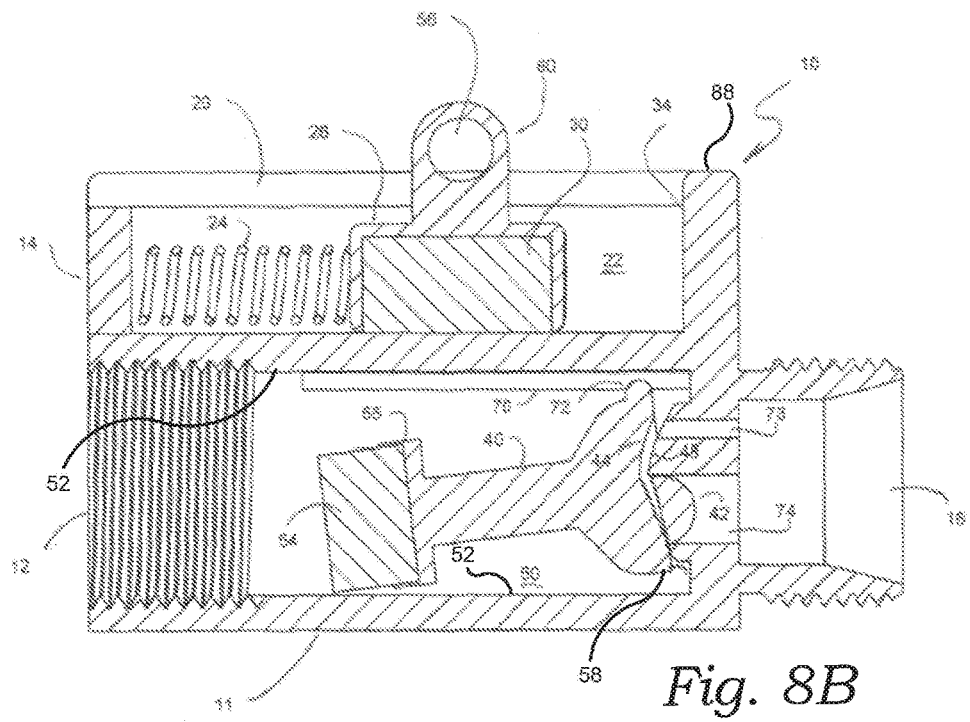
FIG. 8B is a cross-sectional view taken along line A-A of FIG. 8A.

In at least one embodiment, as illustrated in FIGS. 1B, 2B and 3B for example, the inner wall 52 of the valve cavity 50 provides an at least one elongate guide rail 70 positioned and configured for guiding and assisting in the movement of the toggle plunger 40 between the open position and closed position—specifically, to better ensure that the toggle plunger 40 does not over-rotate or otherwise unintentionally move out of position. The at least one guide rail 70 also assists in maintaining the plunger magnet 54 in proper alignment with the actuator magnet 30 when the actuator magnet 30 is in the active state. In at least one such embodiment, the inner wall 52 provides a pair of substantially parallel, spaced-apart guide rails 70, while the toggle plunger 40 provides an at least one guide blade 72 positioned and configured for riding between the guide rails 70. In at least one alternate embodiment, the at least one guide rail 70 and corresponding guide blade 72 are omitted. In at least one such alternate embodiment, the valve cavity 50 has a lateral width that approximates a lateral width of the toggle plunger 40, thereby maintaining the plunger magnet 54 in proper alignment with the actuator magnet 30 when the actuator magnet 30 is in the active state. In at least one embodiment, the inner wall 52 of the valve cavity 50 and the plunger magnet 54 (or the toggle plunger 40) provide complimentary surfaces in order to increase the surface area of contact between the plunger magnet 54 (or the toggle plunger 40) and the inner wall 52, when the toggle plunger 40 moves into the open position, so as to better absorb and disperse any impact therebetween. In at least one such embodiment, as illustrated in FIGS. 5B and 6B for example, the inner wall 52 of the valve cavity 50 provides an angled contact surface. In at least one alternate embodiment, the plunger magnet 54 (or the toggle plunger 40) provides an angled contact surface.

Figure 9A:
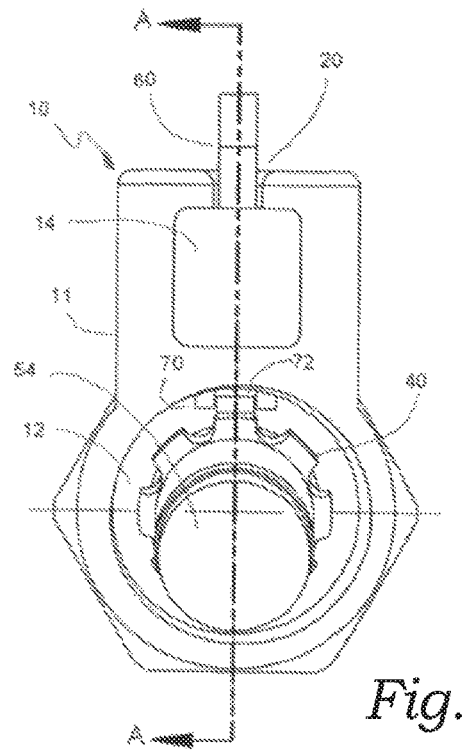
FIG. 9A is a top plan view of said still further exemplary magnetically toggled valve apparatus in a fully open position, in accordance with at least one embodiment.
Figure 9B:
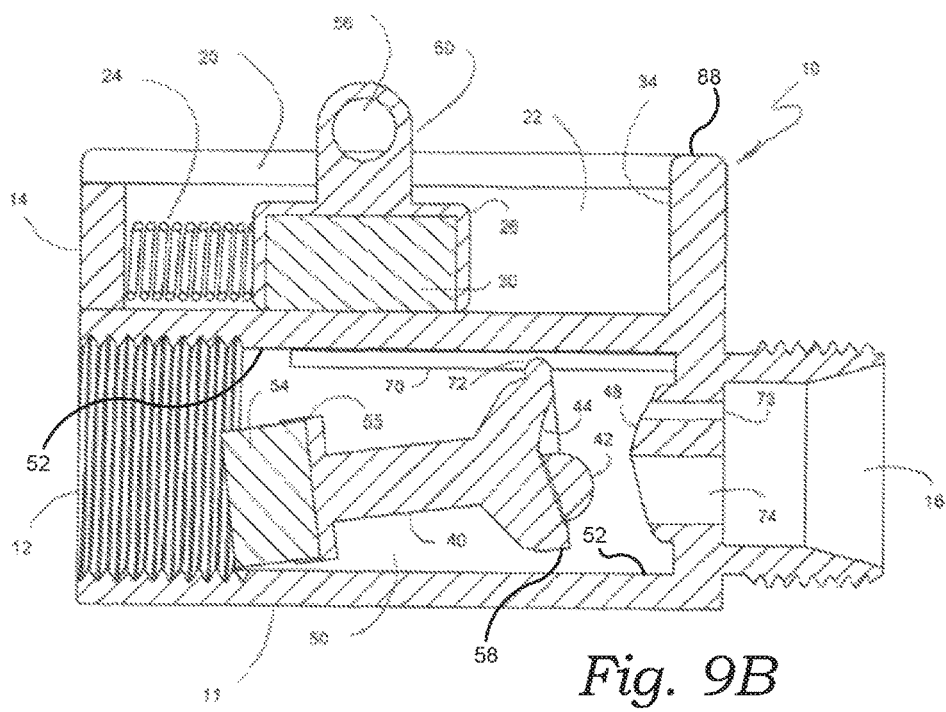
FIG. 9B is a cross-sectional view taken along line A-A of FIG. 9A.
Figure 10A:
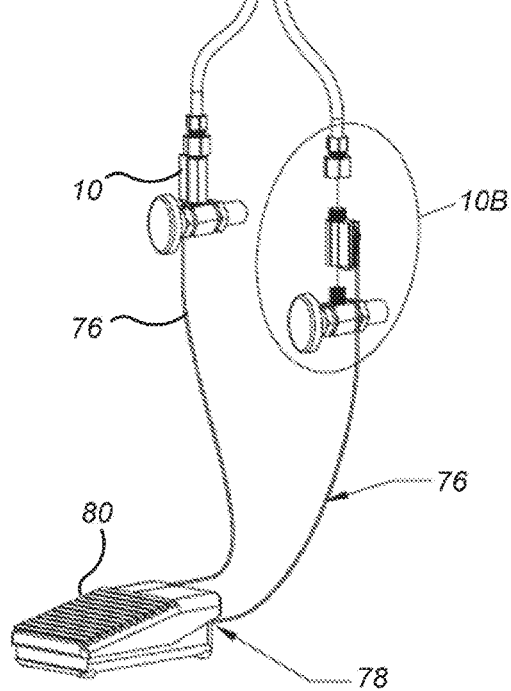
FIG. 10A is a diagrammatic view of an exemplary magnetically toggled valve apparatus installed inline with a faucet, in accordance with at least one embodiment.
Figure 10B:
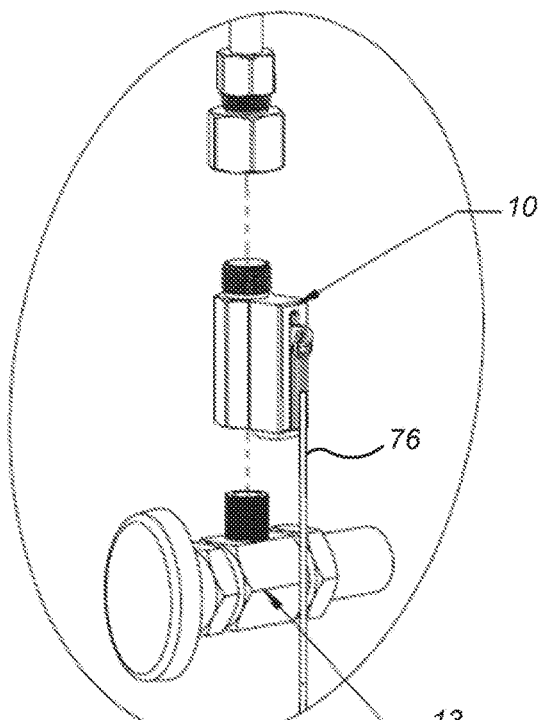
FIG. 10B is a detailed view of the section defined by line 10B of FIG. 10A.
Figure 11B:
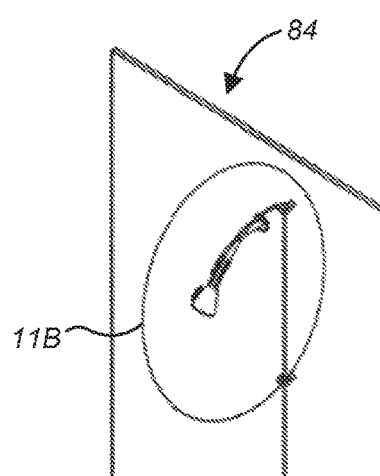
FIG. 11B is a detailed view of the section defined by line 11B of FIG. 11A.
Figure 11A:
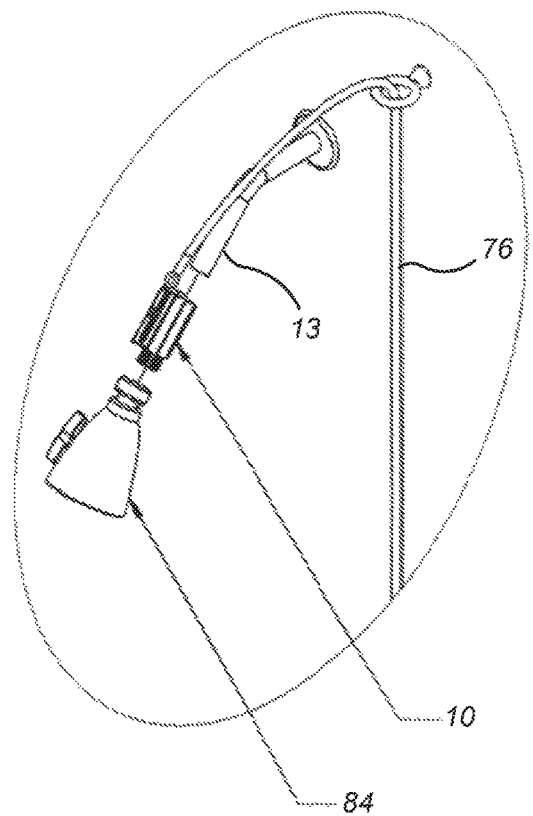
FIG. 11A is a diagrammatic view of an exemplary magnetically toggled valve apparatus installed inline with a shower, in accordance with at least one embodiment.
Figure 11A:
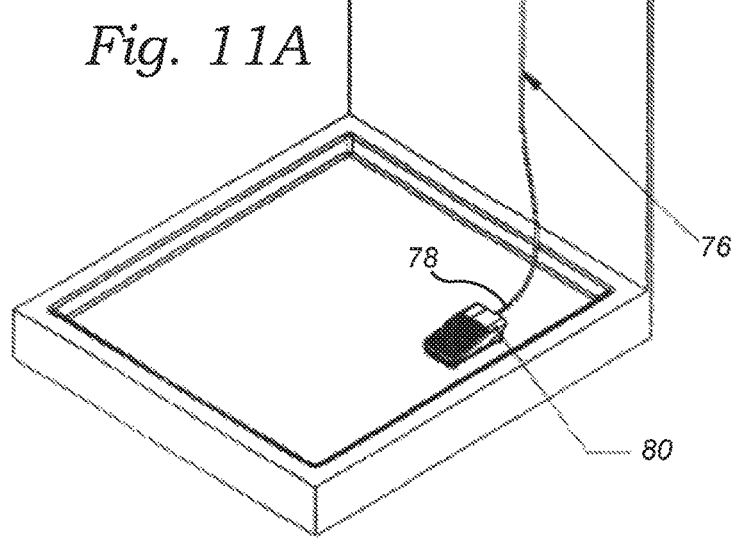

In at least one alternate embodiment, as illustrated in FIGS. 7A-9B, the valve closure 42 of the toggle plunger 40 is formed to continue blocking the main outlet 74 through an initial break of the seal at the pilot hole 73 followed with the initial incremental rotation of the toggler plunger 40, as the toggle plunger 40 moves from the closed position to the open position. In at least one such alternate embodiment, as the separation is initiated, it is expected that the flow through the pilot hole 73 will reduce the total force, and turbulence from the flow will lift the mating surface 44 from the valve seat 48 followed with a rise of the valve closure 42 from the main outlet 74. In at least one such embodiment, the valve closure 42 is flexibly coupled to the mating surface 44 with a hinge, or a bellows spring, or a film element, or any other structure or mechanism now known or later developed. In a high pressure application, the valve closure 42 in such an embodiment remains to provide a complete stationary blockage of in the main outlet 74 through the incremental rotation of toggle plunger 40 from the closed position to the open position. FIG. 7B illustrates the toggle plunger 40 in the closed position, with the valve closure 42 being closely coupled to the mating surface 44 of the toggle plunger 40. A small gap is shown in FIG. 8B to illustrate the process of the toggle plunger 40 rotating with respect to the valve seat 48. After the toggle plunger 40 fully moves into the open position, as illustrated in FIG. 9B, the valve closure 42 returns to a closely coupled condition with respect to the mating surface 44 in response to a restoring torque applied by the flexible coupling between the valve closure 42 and the mating surface 44.

In at least one embodiment, upon the actuating magnet 30 subsequently transitioning back into the inactive state (thereby removing the magnetic influence on the plunger magnet 54 through the valve body 11), the toggle plunger 40 moves back into the closed position. Specifically, in at least one such embodiment, transitioning the actuating magnet 30 into the inactive state removes the force holding the plunger magnet 54 against the opposing inner wall 52 of the valve cavity 50 (opposite the actuating magnet 30), allowing the flow of commodity passing over and around the toggle plunger 40 to carry the toggle plunger 40 back to the closed position.

In at least one alternate embodiment, the actuating magnet 30 has the opposite magnetic polarity from the plunger magnet 54. In such an embodiment, when the actuating magnet 30 is transitioned into the active state, the plunger magnet 54 is attracted to the actuating magnet 30 through the valve body 11 which, in turn, causes the toggle plunger 40 to pivot toward the actuating magnet 30 and into the open position; and when the actuating magnet 30 is subsequently transitioned into the inactive state, the magnetic attraction to the plunger magnet 54 is lost which, in turn, causes the toggle plunger 40 to fall back into the closed position. In at least one embodiment, the actuating magnet 30 and plunger magnet 54 are permanent magnets. In at least one alternate embodiment, the actuating magnet 30 and plunger magnet 54 are formed from programmable magnets as a pair to maintain the opposing or attracting polarity as required to repel or attract the plunger magnet 54 as required to obtain the necessary actuating torque on the toggle plunger 40 to move the toggle plunger 40 between the closed position and the open position based on the relative state of the actuating magnet 30. In at least one embodiment, such programmable magnets also allow rotation of the toggle plunger 40 and, in turn, the plunger magnet 54 within the valve cavity 50 while maintaining the necessary repulsive or attractive force relative to the actuating magnet 30, without regard to the angular position of the toggle plunger 40 relative to the valve cavity 50.

Selective transition of the actuating magnet 30 between the active state and inactive state may be achieved through a variety of mechanisms and techniques, both now known and later developed. For example, in at least one embodiment, the valve body 11 provides a substantially tubular actuator cavity 22 positioned adjacent and external to the valve cavity 50. The actuating magnet 30 is slidably positioned within the actuator cavity 22 and capable of physically moving linearly between the inactive state (FIG. 1B)—wherein the actuating magnet 30 is in substantially abutting contact with a stop 34 provided by the valve body 11—and the active state (FIG. 3B)—wherein the actuating magnet 30 is moved a distance away from the stop 34, into magnetic proximity to the plunger magnet 54. In at least one such embodiment, a spring 24 is also positioned within the actuator cavity 22 and configured for urging the actuating magnet 30 into the inactive state. It should be noted that the term "spring" is intended to encompass any elastic or resilient object or material (or any combination thereof), now known or later developed, that is capable of urging the actuating magnet 30 into the inactive state. In at least one embodiment, the spring 24 is positioned at an opposing end of the actuator cavity 22 relative to the stop 34, between the actuating magnet 30 and a plug 14. In at least one such embodiment, the plug 14 is engaged with said opposing end of the actuator cavity 22 opposite the stop 34. In at least one embodiment, the plug 14 is configured for retaining the spring 24 and actuating magnet 30 within the actuator cavity 22. In at least one alternate embodiment, the plug 14 is omitted, with the valve body 11 instead providing a further stop, such that the actuator cavity 22 is sandwiched between two stops.

Figure 4A:
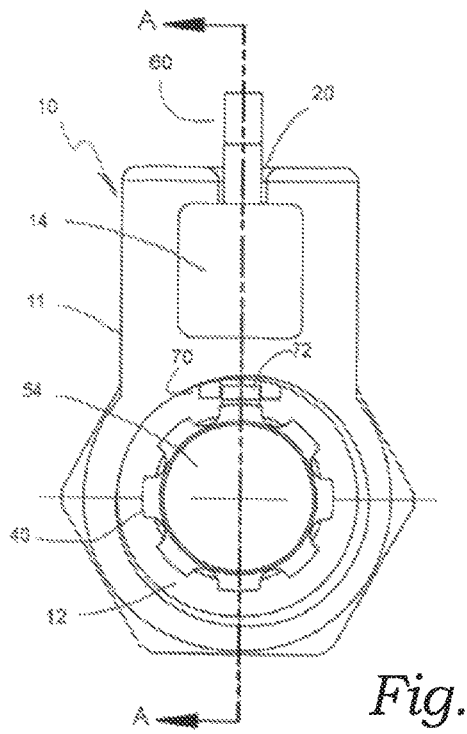
FIG. 4A is a top plan view of a further exemplary magnetically toggled valve apparatus in a closed position, in accordance with at least one embodiment.
Figure 4B:
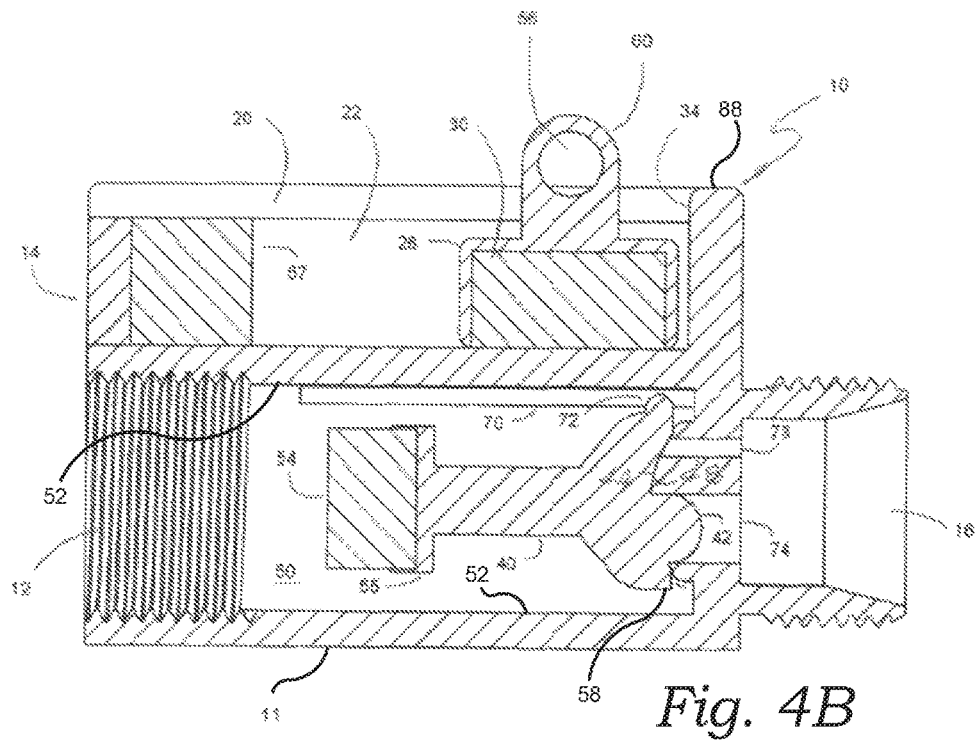
FIG. 4B is a cross-sectional view taken along line A-A of FIG. 4A.

In at least one alternate embodiment, as best illustrated in FIG. 4B, a restoring magnet 57 is positioned within the actuator cavity 22 (in lieu of the spring 24) and configured for urging the actuating magnet 30 into the inactive state. Thus, in such an embodiment, the restoring magnet 57 has the same magnetic polarity as the actuating magnet 30, thereby repelling the actuating magnet 30 back into the inactive state. In at least one embodiment, the restoring magnet 57 is positioned between the actuating magnet 30 and the plug 14. In still further alternate embodiments, any other mechanism capable of urging the actuating magnet 30 into the inactive state, now known or later developed, may be substituted.

In at least one embodiment, the valve body 11 provides a longitudinal actuator slot 20 extending into the actuator cavity 22. Additionally, in at least one such embodiment, the actuating magnet 30 is positioned within a magnet holder 26, with the magnet holder 26 itself also being positioned within the actuator cavity 22. The magnet holder 26 provides an integral arm 60 that extends through the actuator slot 20, thereby allowing the magnet holder 26—and, in turn, the actuating magnet 30—to be manually moved between the active state and inactive state. In at least one such embodiment, a terminal end of the arm 60 provides an aperture 56 configured for providing a point of attachment for an external mechanism to selectively move the magnet holder 26 between the active state and inactive state, as discussed further below.

In at least one such embodiment, as illustrated in FIGS. 10A-11B, a cable 76—i.e., a string, cord, chain, or any other mechanism or material, now known or later developed, capable of functioning as a cable to be manually pulled—is attached to the aperture 56, thereby allowing the actuating magnet 30 to be selectively moved into the active state which, in turn, moves the toggle plunger 40 into the open position, upon manually pulling the cable 76. Given that the actuating magnet 30 is biased into the inactive state in at least one such embodiment, the actuating magnet 30 will automatically return to the inactive state upon the cable 76 being released, thereby causing the toggle plunger 40 to move back into the closed position. In at least one such embodiment, a terminal end 78 of the cable 76 is optionally connected to a foot pedal 80, thereby allowing the movement of the actuating magnet 30 to be controlled in a "hands free" manner by selectively depressing the foot pedal 80. Accordingly, in at least one such embodiment, the apparatus 10 may be incorporated into a faucet 82 (FIGS. 10A and 10B) or a shower 84 (FIGS. 11A and 11B) for example.

In at least one further embodiment, as illustrated in FIGS. 5A-6B, selective transition of the actuating magnet 30 between the active state and inactive state is achieved through a lever 86 engaged with the actuating magnet 30—or any other mechanism, now known or later developed, capable of functioning as a lever—with the lever 86 positioned and configured for pivoting relative to the valve body 11 and, in turn, moving the actuating magnet 30 rotationally on an arc between the active state (FIG. 6B)—wherein the actuating magnet 30 is rotated into sufficient proximity to the plunger magnet 54 such that the magnetic force of the actuating magnet 30 acts upon the plunger magnet 54 through the valve body 11 in order to move the toggle plunger 40 into the open position—and the inactive state (FIG. 5B)—wherein the actuating magnet 30 is rotated a distance away from the plunger magnet 54 such that the magnetic force of the actuating magnet 30 no longer acts upon the plunger magnet 54 through the valve body 11, thereby causing the toggle plunger 40 to move back into the closed position. In at least one such embodiment, the lever 86 is pivotally engaged with an outer surface 88 of the valve body 11. In at least one embodiment, a spring or other biasing mechanism is positioned and configured for urging the lever 86 and, in turn, the actuating magnet 30 into the inactive state. In at least one alternate embodiment, the repelling magnetic forces between the actuating magnet 30 and plunger magnet 54 urge the actuating magnet 30 into the inactive state. Additionally, in at least one embodiment, the lever 86 is capable of being selectively locked in place when the actuating magnet 30 is in the active state, thereby preventing the magnetic forces between the actuating magnet 30 and plunger magnet 54 from unintentionally forcing the actuating magnet 30 back into the inactive state during use of the apparatus 10. In at least one embodiment, the outer surface 88 of the valve body 11 provides an actuator recess 90 positioned and configured for allowing the actuating magnet 30 to be positioned therewithin when the actuating magnet 30 is in the active state, thereby enabling the actuating magnet 30 to be positioned relatively closer to the plunger magnet 54 when the actuating magnet 30 is in the active state so as to increase the magnetic force acting upon the plunger magnet 54. In such an embodiment, the actuator recess 90 does not extend all the way through the valve body 11, into the valve cavity 50, thereby maintaining the integrity of the valve cavity 50, with the only openings being the commodity input 12 and the commodity output 16. Thus, in at least one embodiment, the apparatus 10 eliminates the need for penetration of the valve body 11 by a shaft or other mechanism to control the flow of commodity, thereby reducing the likelihood of the valve body 11 ever developing a leak (or requiring maintenance or repair), while also eliminating the need for a seal or packing.

In at least one still further embodiment, selective transition of the actuating magnet 30 between the active state and inactive state is achieved by virtue of the actuating magnet 30 being a stationary electromagnet—or any other mechanism or technique, now known or later developed, capable of functioning as an electromagnet. In at least one such embodiment, the actuating magnet 30 is configured for transitioning between the active state—wherein an appropriate electrical current is applied to the actuating magnet 30, thereby generating a magnetic field that acts upon the plunger magnet 54 through the valve body 11 in order to move the toggle plunger 40 into the open position—and the inactive state—wherein the electrical current is turned off, thereby causing the magnetic field to disappear such that the toggle plunger 40 moves back into the closed position. In at least one such embodiment, selective transition of the actuating magnet 30 between the active state and inactive state may be triggered locally on the apparatus 10 (such as via a button or switch, for example). In at least one alternate embodiment, selective transition of the actuating magnet 30 between the active state and inactive state may be triggered remotely, such as via a device separate from the apparatus 10—such a separate device being in either wired or wireless communication with the apparatus 10.

Again, in still further alternate embodiments, any other mechanism capable of selectively moving or otherwise transitioning the actuating magnet 30 between the active state and inactive state, now known or later developed, may be substituted. Thus, it should be reiterated that the above non-limiting examples are provided for illustrative purposes only in order to facilitate a more complete understanding of representative embodiments now contemplated. These examples are intended to be a mere subset of all possible contexts in which the apparatus 10 may be utilized. Thus, these examples should not be construed to limit any of the embodiments described in the present specification. Ultimately, the apparatus 10 may be utilized in virtually any context where a magnetically toggled valve is desired. In at least one further embodiment, the apparatus 10 comprises a high pressure portion and a low pressure portion. In at least one still further embodiment, the apparatus 10 may be configured to adjust a characteristic of the flow of commodity out of the commodity output 16, such as commodity pressure, flow volume, and a flow velocity.

Aspects of the present specification may also be described as the following embodiments:

1. A magnetically toggled valve apparatus comprising: a valve body providing a valve cavity sized and configured for allowing a commodity to selectively flow therethrough, the valve cavity providing a commodity input configured for engagement with a commodity input source, and a commodity output in fluid communication with the commodity input; a toggle plunger positioned within the valve cavity; a first end of the toggle plunger providing a plunger magnet; an opposing second end of the toggle plunger configured for selectively contacting a valve seat provided by a base of the valve cavity, the valve seat being proximal and in fluid communication with the commodity output; the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; and an actuating magnet positioned adjacent and external to the valve cavity, the actuating magnet configured for transitioning between an active state—wherein a magnetic force of the actuating magnet acts upon the plunger magnet through the valve body in order to move the toggle plunger into the open position—and an inactive state—wherein the magnetic force of the actuating magnet no longer acts upon the plunger magnet through the valve body, thereby causing the toggle plunger to move back into the closed position.

2. The magnetically toggled valve apparatus according to embodiment 1, wherein the commodity input is further configured for receiving the commodity from the commodity input source and subsequently delivering the commodity through the valve cavity to the commodity output.

3. The magnetically toggled valve apparatus according to embodiments 1-2, wherein the second end of the toggle plunger provides a mating surface sized and configured for complementing and mating with the valve seat when the toggle plunger is in the closed position.

4. The magnetically toggled valve apparatus according to embodiments 1-3, wherein the valve seat provides a main hole extending through the valve seat, enabling fluid communication between the valve cavity and the commodity output.

5. The magnetically toggled valve apparatus according to embodiments 1-4, wherein the mating surface provides a valve closure sized and configured for being removably engaged within the main hole when the toggle plunger is in the closed position.

6. The magnetically toggled valve apparatus according to embodiments 1-5, wherein the valve closure is flexibly coupled to the mating surface, thereby enabling the valve closure to remain positioned within the main hole of the valve seat until the toggle plunger has fully reached the open position.

7. The magnetically toggled valve apparatus according to embodiments 1-6, wherein the valve seat provides an at least one pilot hole extending through the valve seat, further enabling fluid communication between the valve cavity and the commodity output, the at least one pilot hole having a diameter that is relatively smaller than a diameter of the main hole.

8. The magnetically toggled valve apparatus according to embodiments 1-7, wherein a plurality of pilot holes are concentrically arranged around the main hole in the valve seat.

9. The magnetically toggled valve apparatus according to embodiments 1-8, wherein a magnetic polarity of the actuating magnet is the same as a magnetic polarity of the plunger magnet, thereby creating a repulsive magnetic force therebetween.

10. The magnetically toggled valve apparatus according to embodiments 1-9, wherein a magnetic polarity of the actuating magnet is opposite to a magnetic polarity of the plunger magnet, thereby creating an attractive magnetic force therebetween.

11. The magnetically toggled valve apparatus according to embodiments 1-10, wherein an inner wall of the valve cavity provides an at least one elongate guide rail positioned and configured for guiding and assisting in the movement of the toggle plunger between the open position and closed position.

12. The magnetically toggled valve apparatus according to embodiments 1-11, wherein: the inner wall provides a pair of substantially parallel, spaced-apart guide rails; and the toggle plunger provides an at least one guide blade positioned and configured for riding between the guide rails.

13. The magnetically toggled valve apparatus according to embodiments 1-12, wherein an inner wall of the valve cavity and at least one of the plunger magnet and toggle plunger provide complimentary surfaces configured for increasing a surface area of contact therebetween when the toggle plunger moves into the open position.

14. The magnetically toggled valve apparatus according to embodiments 1-13, wherein the inner wall of the valve cavity provides an angled contact surface.

15. The magnetically toggled valve apparatus according to embodiments 1-14, wherein at least one of the plunger magnet and toggle plunger provides an angled contact surface.

16. The magnetically toggled valve apparatus according to embodiments 1-15, wherein the actuating magnet and plunger magnet are permanent magnets.

17. The magnetically toggled valve apparatus according to embodiments 1-16, wherein the actuating magnet and plunger magnet are programmable magnets.

18. The magnetically toggled valve apparatus according to embodiments 1-17, wherein the valve body further provides a substantially tubular actuator cavity positioned adjacent and external to the valve cavity, the actuating magnet being slidably positioned within the actuator cavity and capable of moving linearly between the active state—wherein the actuating magnet is moved a distance away from a stop positioned within the actuator cavity, into magnetic proximity to the plunger magnet such that the magnetic force of the actuating magnet acts upon the plunger magnet through the valve body in order to move the toggle plunger into the open position—and the inactive state—wherein the actuating magnet is moved out of magnetic proximity to the plunger magnet, and in substantially abutting contact with the stop, such that the magnetic force of the actuating magnet no longer acts upon the plunger magnet through the valve body, thereby causing the toggle plunger to move back into the closed position.

19. The magnetically toggled valve apparatus according to embodiments 1-18, further comprising at least one of a spring and a restoring magnet positioned within the actuator cavity, opposite the stop, and configured for urging the actuating magnet into the inactive state.

20. The magnetically toggled valve apparatus according to embodiments 1-19, wherein: the valve body further provides a longitudinal actuator slot extending into the actuator cavity; the actuating magnet is positioned within a magnet holder, with the magnet holder itself also being positioned within the actuator cavity; and the magnet holder provides an integral arm that extends through the actuator slot, thereby allowing the magnet holder and, in turn, the actuating magnet to be manually moved between the active state and inactive state.

21. The magnetically toggled valve apparatus according to embodiments 1-20, wherein a terminal end of the arm provides an aperture, to which a cable is attached, thereby allowing the magnet holder and, in turn, the actuating magnet to be moved into the active state upon manually pulling the cable.

22. The magnetically toggled valve apparatus according to embodiments 1-21, wherein a terminal end of the cable is connected to a foot pedal, thereby allowing the magnet holder and, in turn, the actuating magnet to be moved into the active state upon manually depressing the foot pedal.

23. The magnetically toggled valve apparatus according to embodiments 1-22, wherein the actuating magnet is engaged with a lever positioned and configured for selectively pivoting relative to the valve body and, in turn, moving the actuating magnet rotationally on an arc between the active state—wherein the actuating magnet is rotated into sufficient proximity to the plunger magnet such that the magnetic force of the actuating magnet acts upon the plunger magnet through the valve body in order to move the toggle plunger into the open position—and the inactive state—wherein the actuating magnet is rotated a distance away from the plunger magnet such that the magnetic force of the actuating magnet no longer acts upon the plunger magnet through the valve body, thereby causing the toggle plunger to move back into the closed position.

24. The magnetically toggled valve apparatus according to embodiments 1-23, wherein the lever is pivotally engaged with an outer surface of the valve body.

25. The magnetically toggled valve apparatus according to embodiments 1-24, further comprising a spring positioned and configured for urging the lever and, in turn, the actuating magnet into the inactive state.

26. The magnetically toggled valve apparatus according to embodiments 1-25, wherein the lever is capable of being selectively locked in place when the actuating magnet is in the active state.

27. The magnetically toggled valve apparatus according to embodiments 1-26, wherein an outer surface of the valve body provides an actuator recess positioned and configured for allowing the actuating magnet to be positioned therewithin when the actuating magnet is in the active state, thereby reducing the distance between the actuating magnet and the plunger magnet when the actuating magnet is in the active state.

28. The magnetically toggled valve apparatus according to embodiments 1-27, wherein the actuating magnet is an electromagnet configured for transitioning between the active state—wherein an appropriate electrical current is applied to the actuating magnet, thereby generating a magnetic field that acts upon the plunger magnet through the valve body in order to move the toggle plunger into the open position—and the inactive state—wherein the electrical current is turned off, thereby causing the magnetic field to disappear such that the toggle plunger moves back into the closed position.

29. A magnetically toggled valve apparatus comprising: a valve body providing a valve cavity sized and configured for allowing a commodity to selectively flow therethrough, the valve cavity providing a commodity input configured for engagement with a commodity input source, and a commodity output in fluid communication with the commodity input; a toggle plunger positioned within the valve cavity; a first end of the toggle plunger providing a plunger magnet; an opposing second end of the toggle plunger configured for selectively contacting a valve seat provided by a base of the valve cavity, the valve seat being proximal and in fluid communication with the commodity output; the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; a substantially tubular actuator cavity positioned adjacent and external to the valve cavity; and an actuating magnet slidably positioned within the actuator cavity, the actuating magnet configured for moving linearly between an active state—wherein the actuating magnet is moved into sufficient proximity to the plunger magnet such that a magnetic force of the actuating magnet acts upon the plunger magnet through the valve body in order to move the toggle plunger into the open position—and an inactive state—wherein the actuating magnet is moved a distance away from the plunger magnet such that the magnetic force of the actuating magnet no longer acts upon the plunger magnet through the valve body, thereby causing the toggle plunger to move back into the closed position.

30. A magnetically toggled valve apparatus comprising: a valve body providing a valve cavity sized and configured for allowing a commodity to selectively flow therethrough, the valve cavity providing a commodity input configured for engagement with a commodity input source, and a commodity output in fluid communication with the commodity input; a toggle plunger positioned within the valve cavity; a first end of the toggle plunger providing a plunger magnet; an opposing second end of the toggle plunger configured for selectively contacting a valve seat provided by a base of the valve cavity, the valve seat being proximal and in fluid communication with the commodity output; the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; an actuating magnet positioned adjacent and external to the valve cavity, the actuating magnet configured for moving between an active state—wherein the actuating magnet is moved into sufficient proximity to the plunger magnet such that a magnetic force of the actuating magnet acts upon the plunger magnet through the valve body in order to move the toggle plunger into the open position—and an inactive state—wherein the actuating magnet is moved a distance away from the plunger magnet such that the magnetic force of the actuating magnet no longer acts upon the plunger magnet through the valve body, thereby causing the toggle plunger to move back into the closed position; and a lever engaged with the actuating magnet, the lever positioned and configured for selectively pivoting relative to the valve body and, in turn, moving the actuating magnet rotationally on an arc between the active state and inactive state.

31. A magnetically toggled valve apparatus comprising: a valve body providing a valve cavity sized and configured for allowing a commodity to selectively flow therethrough, the valve cavity providing a commodity input configured for engagement with a commodity input source, and a commodity output in fluid communication with the commodity input; a toggle plunger positioned within the valve cavity; a first end of the toggle plunger providing a plunger magnet; an opposing second end of the toggle plunger configured for selectively contacting a valve seat provided by a base of the valve cavity, the valve seat being proximal and in fluid communication with the commodity output; the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; and an actuating magnet positioned adjacent and external to the valve cavity, the actuating magnet being an electromagnet configured for transitioning between an active state—wherein an appropriate electrical current is applied to the actuating magnet, thereby generating a magnetic field that acts upon the plunger magnet through the valve body in order to move the toggle plunger into the open position—and an inactive state—wherein the electrical current is turned off, thereby causing the magnetic field to disappear such that the toggle plunger moves back into the closed position.

In closing, regarding the exemplary embodiments of the present invention as shown and described herein, it will be appreciated that a magnetically toggled valve apparatus is disclosed. Because the principles of the invention may be practiced in a number of configurations beyond those shown and described, it is to be understood that the invention is not in any way limited by the exemplary embodiments, but is generally directed to a magnetically toggled valve apparatus and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, as used herein, unless indicated to the contrary, the term "substantially" is a term of degree intended to indicate an approximation of the characteristic, item, quantity, parameter, property, or term so qualified, encompassing a range that can be understood and construed by those of ordinary skill in the art.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising" (along with equivalent open-ended transitional phrases thereof such as "including," "containing" and "having") encompasses all the expressly recited elements, limitations, steps and/or features alone or in combination with un-recited subject matter; the named elements, limitations and/or features are essential, but other unnamed elements, limitations and/or features may be added and still form a construct within the scope of the claim. Specific embodiments disclosed herein may be further limited in the claims using the closed-ended transitional phrases "consisting of" or "consisting essentially of" in lieu of or as an amendment for "comprising." When used in the claims, whether as filed or added per amendment, the closed-ended transitional phrase "consisting of" excludes any element, limitation, step, or feature not expressly recited in the claims. The closed-ended transitional phrase "consisting essentially of" limits the scope of a claim to the expressly recited elements, limitations, steps and/or features and any other elements, limitations, steps and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps and/or features specifically recited in the claim, whereas the meaning of the closed-ended transitional phrase "consisting essentially of" is being defined as only including those elements, limitations, steps and/or features specifically recited in the claim and those elements, limitations, steps and/or features that do not materially affect the basic and novel characteristic(s) of the claimed subject matter. Therefore, the open-ended transitional phrase "comprising" (along with equivalent open-ended transitional phrases thereof) includes within its meaning, as a limiting case, claimed subject matter specified by the closed-ended transitional phrases "consisting of" or "consisting essentially of." As such, embodiments described herein or so claimed with the phrase "comprising" are expressly or inherently unambiguously described, enabled and supported herein for the phrases "consisting essentially of" and "consisting of."

All patents, patent publications, and other publications referenced and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A magnetically toggled valve apparatus comprising:
    a valve body providing a valve cavity sized and configured for allowing a commodity to selectively flow therethrough, the valve cavity providing a commodity input configured for engagement with a commodity input source, and a commodity output in fluid communication with the commodity input;
    a toggle plunger positioned within the valve cavity, the toggle plunger sized for being capable of moving both longitudinally and laterally within the valve cavity;
    a first end of the toggle plunger providing a plunger magnet;
    an opposing second end of the toggle plunger configured for selectively contacting a valve seat provided by a base of the valve cavity, the valve seat being proximal and in fluid communication with the commodity output;
    the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; and
    an actuating magnet positioned adjacent and external to the valve cavity, the actuating magnet configured for transitioning between an active state—wherein a magnetic force of the actuating magnet acts upon the plunger magnet through the valve body in order to move the toggle plunger into the open position—and an inactive state—wherein the magnetic force of the actuating magnet no longer acts upon the plunger magnet through the valve body, thereby causing the toggle plunger to move back into the closed position.

2. The magnetically toggled valve apparatus of claim 1, wherein the second end of the toggle plunger provides a mating surface sized and configured for complementing and mating with the valve seat when the toggle plunger is in the closed position.

3. The magnetically toggled valve apparatus of claim 2, wherein the valve seat provides a main hole extending through the valve seat, enabling fluid communication between the valve cavity and the commodity output.

4. The magnetically toggled valve apparatus of claim 3, wherein the mating surface provides a valve closure sized and configured for being removably engaged within the main hole when the toggle plunger is in the closed position.

5. The magnetically toggled valve apparatus of claim 3, wherein the valve seat provides an at least one pilot hole extending through the valve seat, further enabling fluid communication between the valve cavity and the commodity output, the at least one pilot hole having a diameter that is relatively smaller than a diameter of the main hole.

6. The magnetically toggled valve apparatus of claim 1, wherein an inner wall of the valve cavity provides an at least one elongate guide rail positioned and configured for guiding and assisting in the movement of the toggle plunger between the open position and closed position.

7. The magnetically toggled valve apparatus of claim 6, wherein:
the inner wall provides a pair of substantially parallel, spaced-apart guide rails; and
the toggle plunger provides an at least one guide blade positioned and configured for riding between the guide rails.

8. The magnetically toggled valve apparatus of claim 1, wherein an inner wall of the valve cavity and at least one of the plunger magnet and toggle plunger provide complimentary surfaces configured for increasing a surface area of contact therebetween when the toggle plunger moves into the open position.

9. The magnetically toggled valve apparatus of claim 1, wherein the valve body further provides a substantially tubular actuator cavity positioned adjacent and external to the valve cavity, the actuating magnet being slidably positioned within the actuator cavity and capable of moving linearly between the active state—wherein the actuating magnet is moved a distance away from a stop positioned within the actuator cavity, into magnetic proximity to the plunger magnet such that the magnetic force of the actuating magnet acts upon the plunger magnet through the valve body in order to move the toggle plunger into the open position—and the inactive state—wherein the actuating magnet is moved out of magnetic proximity to the plunger magnet, and in substantially abutting contact with the stop, such that the magnetic force of the actuating magnet no longer acts upon the plunger magnet through the valve body, thereby causing the toggle plunger to move back into the closed position.

10. The magnetically toggled valve apparatus of claim 9, further comprising at least one of a spring and a restoring magnet positioned within the actuator cavity, opposite the stop, and configured for urging the actuating magnet into the inactive state.

11. The magnetically toggled valve apparatus of claim 9, wherein:
the valve body further provides a longitudinal actuator slot extending into the actuator cavity;
the actuating magnet is positioned within a magnet holder, with the magnet holder itself also being positioned within the actuator cavity; and
the magnet holder provides an integral arm that extends through the actuator slot, thereby allowing the magnet holder and, in turn, the actuating magnet to be manually moved between the active state and inactive state.

12. The magnetically toggled valve apparatus of claim 11, wherein a terminal end of the arm provides an aperture, to which a cable is attached, thereby allowing the magnet holder and, in turn, the actuating magnet to be moved into the active state upon manually pulling the cable.

13. The magnetically toggled valve apparatus of claim 12, wherein a terminal end of the cable is connected to a foot pedal, thereby allowing the magnet holder and, in turn, the actuating magnet to be moved into the active state upon manually depressing the foot pedal.

14. The magnetically toggled valve apparatus of claim 1, wherein the actuating magnet is engaged with a lever positioned and configured for selectively pivoting relative to the valve body and, in turn, moving the actuating magnet rotationally on an arc between the active state—wherein the actuating magnet is rotated into sufficient proximity to the plunger magnet such that the magnetic force of the actuating magnet acts upon the plunger magnet through the valve body in order to move the toggle plunger into the open position—and the inactive state—wherein the actuating magnet is rotated a distance away from the plunger magnet such that the magnetic force of the actuating magnet no longer acts upon the plunger magnet through the valve body, thereby causing the toggle plunger to move back into the closed position.

15. The magnetically toggled valve apparatus of claim 14, further comprising a spring positioned and configured for urging the lever and, in turn, the actuating magnet into the inactive state.

16. The magnetically toggled valve apparatus of claim 14, wherein the lever is capable of being selectively locked in place when the actuating magnet is in the active state.

17. The magnetically toggled valve apparatus of claim 14, wherein an outer surface of the valve body provides an actuator recess positioned and configured for allowing the actuating magnet to be positioned therewithin when the actuating magnet is in the active state, thereby reducing the distance between the actuating magnet and the plunger magnet when the actuating magnet is in the active state.

18. The magnetically toggled valve apparatus of claim 1, wherein the actuating magnet is an electromagnet configured for transitioning between the active state—wherein an appropriate electrical current is applied to the actuating magnet, thereby generating a magnetic field that acts upon the plunger magnet through the valve body in order to move the toggle plunger into the open position—and the inactive state—wherein the electrical current is turned off, thereby causing the magnetic field to disappear such that the toggle plunger moves back into the closed position.

19. A magnetically toggled valve apparatus comprising:
a valve body providing a valve cavity sized and configured for allowing a commodity to selectively flow therethrough, the valve cavity providing a commodity input configured for engagement with a commodity input source, and a commodity output in fluid communication with the commodity input;

a toggle plunger positioned within the valve cavity;

a first end of the toggle plunger providing a plunger magnet;

an opposing second end of the toggle plunger configured for selectively contacting a valve seat provided by a base of the valve cavity, the valve seat being proximal and in fluid communication with the commodity output;

the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output;

a substantially tubular actuator cavity positioned adjacent and external to the valve cavity, the valve body providing a longitudinal actuator slot extending into the actuator cavity;

a magnet holder slidably positioned within the actuator cavity, the magnet holder providing an integral arm that extends through the actuator slot, thereby allowing the magnet holder to be manually moved linearly within the actuator cavity; and an actuating magnet positioned within the magnet holder, the actuating magnet configured for moving linearly, via the magnet holder, between an active state—wherein the actuating magnet is moved into sufficient proximity to the plunger magnet such that a magnetic force of the actuating magnet acts upon the plunger magnet through the valve body in order to move the toggle plunger into the open position—and an inactive state—wherein the actuating magnet is moved a distance away from the plunger magnet such that the magnetic force of the actuating magnet no longer acts upon the plunger magnet through the valve body, thereby causing the toggle plunger to move back into the closed position.

20. A magnetically toggled valve apparatus comprising:

a valve body providing a valve cavity sized and configured for allowing a commodity to selectively flow therethrough, the valve cavity providing a commodity input configured for engagement with a commodity input source, and a commodity output in fluid communication with the commodity input;

a toggle plunger positioned within the valve cavity;

a first end of the toggle plunger providing a plunger magnet;

an opposing second end of the toggle plunger configured for selectively contacting a valve seat provided by a base of the valve cavity, the valve seat being proximal and in fluid communication with the commodity output;

the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output;

an actuating magnet positioned adjacent and external to the valve cavity, the actuating magnet configured for moving between an active state—wherein the actuating magnet is moved into sufficient proximity to the plunger magnet such that a magnetic force of the actuating magnet acts upon the plunger magnet through the valve body in order to move the toggle plunger into the open position—and an inactive state—wherein the actuating magnet is moved a distance away from the plunger magnet such that the magnetic force of the actuating magnet no longer acts upon the plunger magnet through the valve body, thereby causing the toggle plunger to move back into the closed position; and a lever engaged with the actuating magnet, the lever positioned and configured for selectively pivoting relative to the valve body and, in turn, moving the actuating magnet rotationally on an arc between the active state and inactive state.

21. A magnetically toggled valve apparatus comprising:

a valve body providing a valve cavity of unitary construction, the valve cavity sized and configured for allowing a commodity to selectively flow therethrough, the valve cavity providing a commodity input configured for engagement with a commodity input source, and a commodity output in fluid communication with the commodity input;

a toggle plunger positioned within the valve cavity, the toggle plunger having an orientation that is substantially parallel with a flow direction of the commodity from the commodity input to the commodity output;

a first end of the toggle plunger providing a plunger magnet;

an opposing second end of the toggle plunger configured for selectively contacting a valve seat provided by a base of the valve cavity, the valve seat being proximal and in fluid communication with the commodity output;

the toggle plunger configured for moving between a closed position—wherein the second end of the toggle plunger is in contact with the valve seat so as to create a seal therebetween to prevent the commodity from flowing through the commodity output—and an open position—wherein the second end of the toggle plunger is moved a distance away from the valve seat so as to allow the commodity to flow through the valve seat and, in turn, through the commodity output; and an actuating magnet positioned adjacent and external to the valve cavity, the actuating magnet configured for transitioning between an active state—wherein a magnetic force of the actuating magnet acts upon the plunger magnet through the valve body in order to move the toggle plunger into the open position—and an inactive state—wherein the magnetic force of the actuating magnet no longer acts upon the plunger magnet through the valve body, thereby causing the toggle plunger to move back into the closed position.

* * * * *